(12) United States Patent
Su et al.

(10) Patent No.: US 12,535,585 B2
(45) Date of Patent: Jan. 27, 2026

(54) OBJECT DETECTION WITH MULTIPLE RANGES AND RESOLUTIONS

(71) Applicant: Aptiv Technologies AG, Schaffhausen (CH)

(72) Inventors: Yu Su, Wuppertal (DE); Mirko Meuter, Erkrath (DE)

(73) Assignee: Aptiv Technologies AG, Schaffhausen (CH)

( * ) Notice: Subject to any disclaimer, the term of this patent is extended or adjusted under 35 U.S.C. 154(b) by 1004 days.

(21) Appl. No.: 17/649,666

(22) Filed: Feb. 1, 2022

(65) Prior Publication Data
US 2022/0244383 A1    Aug. 4, 2022

(30) Foreign Application Priority Data
Feb. 2, 2021 (GB) ...................... 2101445

(51) Int. Cl.
*G01S 17/42*    (2006.01)
*G01S 17/86*    (2020.01)
(Continued)

(52) U.S. Cl.
CPC .............. *G01S 17/42* (2013.01); *G01S 17/86* (2020.01); *G01S 17/89* (2013.01); *G06N 3/084* (2013.01)

(58) Field of Classification Search
CPC .......... G01S 17/42; G01S 17/86; G01S 17/89; G01S 13/865; G01S 17/87; G01S 17/931;
(Continued)

(56) References Cited

U.S. PATENT DOCUMENTS 7,639,171 B2    12/2009    Alland et al.
9,470,777 B2    10/2016    Arage
(Continued)

FOREIGN PATENT DOCUMENTS

CN    110210389 A    9/2019
CN    111309906 A    6/2020
(Continued)

OTHER PUBLICATIONS

"Extended European Search Report", EP Application No. 22154478.6, Jun. 20, 2022, 11 pages.
(Continued)

*Primary Examiner* — Ig T An
(74) *Attorney, Agent, or Firm* — Harness, Dickey & Pierce, P.L.C.

(57) ABSTRACT

Provided is a method for object detection in a surrounding of a vehicle using a deep neural network, comprising: inputting a first set of sensor-based data for a first Cartesian grid having a first spatial dimension and a first spatial resolution into a first branch of the deep neural network; inputting a second set of sensor-based data for a second Cartesian grid having a second spatial dimension and a second spatial resolution into a second branch of the deep neural network; providing an interaction between the first branch of the deep neural network and the second branch of the deep neural network at an intermediate stage of the deep neural network; and fusing a first output of the first branch of the deep neural network and a second output of the second branch of the deep neural network to detect the object in the surrounding of the vehicle.

20 Claims, 6 Drawing Sheets

(51) Int. Cl.
*G01S 17/89* (2020.01)
*G06N 3/084* (2023.01)

(58) Field of Classification Search
CPC ... G01S 2013/9323; G01S 2013/93271; G01S 2013/93274; G01S 7/295; G01S 7/417; G01S 13/87; G01S 13/931; G01S 7/4802; G01S 13/343; G01S 7/41; G01S 7/48; G01S 13/34; G06N 3/084; G06N 3/045; G06N 3/08; G06F 18/253; G06F 18/00; G06V 20/58; G06V 10/25; G06V 10/50; G06V 10/762; G06V 10/82
See application file for complete search history.

(56) References Cited

U.S. PATENT DOCUMENTS

| | | | | |
|---|---|---|---|---|
| 10,404,261 | B1* | 9/2019 | Josefsberg | G01S 13/931 |
| 12,140,696 | B2* | 11/2024 | Chen | G01S 7/417 |
| 2021/0255304 | A1* | 8/2021 | Fontijne | G01S 13/931 |
| 2023/0082097 | A1* | 3/2023 | Choi | G06V 20/56 |
| | | | | 382/156 |

FOREIGN PATENT DOCUMENTS

| | | |
|---|---|---|
| EP | 2454079 A1 | 5/2012 |
| EP | 3454079 A1 | 3/2019 |
| WO | 2020113160 A2 | 6/2020 |

OTHER PUBLICATIONS

"Search Report", GB Application No. 2101445.1, Nov. 1, 2021, 2 pages.
Guus Engels, et al., "3D Object Detection From LiDAR Data Using Distance Depended Feature Extraction", Mar. 3, 2020, 10 pages.
Ze Wang, et al., "Range Adaptation for 3D Object Detection in LiDAR", 2019 IEEE/CVF International Conference on Computer Vision Workshop (ICCVW), Sep. 26, 2019, 9 pages.

* cited by examiner

OBJECT DETECTION WITH MULTIPLE RANGES AND RESOLUTIONS

CROSS-REFERENCE OF RELATED APPLICATION

This application claims priority to United Kingdom Patent Application Number 2101445.1, filed Feb. 2, 2021, the disclosure of which is hereby incorporated by reference in its entirety herein.

BACKGROUND

Automotive perception systems are often equipped with multiple sensors, e.g., a combination of one or more of a camera-based sensor, a RADAR-based sensor, a LiDAR-based sensor. The data produced by these sensors usually also have significant differences. For example, the data from a camera-based sensor is normally formatted as image sequences in perspective view, while data from a RADAR-based sensor and a LiDAR-based sensor is usually formatted as a point cloud or the like and a grid in bird's eye view (BEV), i.e., an elevated view of an object from above. In recent years, RADAR-based sensors and LiDAR-based sensors become more necessary components in an autonomous driving system since they are superior in perception of a target's shape and/or distance of the target and are less affected by weather or other environmental conditions.

Tethered with recent progress of deep neural networks, perception systems with a RADAR-based sensor and/or a LiDAR-based sensor have achieved great success. In these systems, the data is usually represented as a point cloud or grid. Although point cloud processing is receiving more and more attention, grid-based systems still dominate available products due to its simplicity in design and similarity to image processing which has been extensively studied.

SUMMARY

The present disclosure relates to a device, a method, and a computer program for object detection in a surrounding of a vehicle using a deep neural network. The device may be provided in a vehicle so that the object is detected for the vehicle.

In a grid-based perception system, given a spatial range and resolution within that spatial range, data is normally represented as a 2D or 3D grid in a world Cartesian coordinate system centred at an ego-vehicle (e.g., an autonomous vehicle or robot), i.e., in a BEV. A disadvantage of this data structure is that its size (e.g., number of nodes of the grid) increases quadratically (2D) or threefold (3D) with spatial range or resolution. For example, for a 2D grid, if resolution is fixed, doubling the range (e.g., from 40 m to 80 m) makes the 2D grid four times bigger. Similarly, resolution increases if the spatial range is fixed. As such, memory requirements, memory consumption and computational costs are also quadratically increased which is often not affordable, e.g., because real-time driving decisions should be made for the ego-vehicle.

The data of a RADAR-based sensor and/or a LiDAR-based sensor are usually in a Polar grid with fixed spatial range and angle resolution. However, the Polar grid is usually converted into a Cartesian grid for better compatibility of deep neural networks. The spatial resolution of a Cartesian grid is, however, not consistent with the spatial resolution of a Polar grid. For example, in the near range, a cell in the Cartesian grid corresponds to multiple cells in the Polar grid, while in the far range, multiple cells in the Cartesian grid correspond to one cell in the Polar grid.

In the literature, there are studies which work with multiple spatial ranges, but they do not address the technical problem of efficient data representation. For example, Wang et al. "Range Adaption for 3D Object Detection in LiDAR", IEEE/CVF International Conference on Computer Vision Workshop (ICCVW), 2019 adapts features extracted from the far range to that of the near range, in order to get more homogeneous features and therefore improve the performance for detecting targets that are further away. Here, the alignment of features is performed in feature space, without considering the spatial correspondence of overlapping region and thus simply align the feature maps from different ranges into a unified feature space. This is done in a network with a special loss function to measure the similarity of feature maps from different ranges.

Further, Engels et al. "3D Object Detection from LiDAR data using distance depended feature extraction", Computer Vision and Pattern Recognition, 2020 trains neural networks for the short-range network and the long-range network separately with the same grid resolution, and then a late fusion is done to combine their outputs.

The subject-matter of the independent claims solves the above-identified technical problems. The dependent claims described further preferred embodiments. Thereby . . . .

According to a first aspect a computer-implemented method is provided for object detection in a surrounding of a vehicle using a deep neural network, the method comprising: inputting a first set of sensor-based data for a first Cartesian grid having a first spatial dimension and a first spatial resolution into a first branch of the deep neural network; inputting a second set of sensor-based data for a second Cartesian grid having a second spatial dimension and a second spatial resolution into a second branch of the deep neural network; providing an interaction between the first branch of the deep neural network and the second branch of the deep neural network at an intermediate stage of the deep neural network to take into account, in processing of subsequent layers of the deep neural network, respectively identified features for an overlapping spatial region of the first and second spatial dimension; and fusing a first output of the first branch of the deep neural network and a second output of the second branch of the deep neural network to detect the object in the surrounding of the vehicle.

According to a second aspect, the first spatial dimension is different from the second spatial dimension and the first spatial resolution is different from the second spatial resolution.

According to a third aspect, the interaction further being provided by re-sampling a first intermediate output of the first branch at the intermediate stage and by re-sampling a second intermediate output of the second branch at the intermediate stage.

According to a fourth aspect, the interaction further being provided by merging the first intermediate output with the re-sampled second intermediate output and by merging the second intermediate output with the re-sampled first intermediate output.

According to a fifth aspect, the merging includes generating a first concatenation of the first intermediate output with the re-sampled second intermediate output and generating a second concatenation of the second intermediate output with the re-sampled first intermediate output.

According to a sixth aspect, the merging further includes a reduction of the first concatenation to generate a first reduced output and a reduction of the second concatenation to generate a second reduced output, wherein the first reduced output and the second reduced output is used in the processing of the subsequent layers of the deep neural network.

According to a seventh aspect, the first reduced output or the second reduced output is used to replace a corresponding part of the first intermediate output or the second intermediate output.

According to an eight aspect, the fusing includes a filtering out of overlapping one or more bounding boxes.

According to a ninth aspect, the fusing includes a prioritizing of information from the first output or the second output by using range information.

According to a tenth aspect, the first output and the second output include information related to one or more of a target class, a bounding box, a position of the object, a size of the object, an orientation of the object and a speed of the object.

According to an eleventh aspect, a computer program comprises instructions which, when the program is executed by a computer, causes the computer to carry out the method of any of the first to tenth aspect.

According to a twelfth aspect, a device is provided for object detection in a surrounding of a vehicle using a deep neural network, wherein the device comprises: an acquisitioning unit configured to acquire sensor-based data regarding each of one or more radar antennas or lasers; a determining unit configured to: input a first set of sensor-based data for a first Cartesian grid having a first spatial dimension and a first spatial resolution into a first branch of the deep neural network; input a second set of sensor-based data for a second Cartesian grid having a second spatial dimension and a second spatial resolution into a second branch of the deep neural network; provide an interaction between the first branch of the deep neural network and the second branch of the deep neural network at an intermediate stage of the deep neural network to take into account, in processing of subsequent layers of the deep neural network, respectively identified features for an overlapping spatial region of the first and second spatial dimension; and fuse a first output of the first branch of the deep neural network and a second output of the second branch of the deep neural network to detect the object in the surrounding of the vehicle.

According to a thirteenth aspect, the device further comprising the one or more radar antennas and/or lasers.

According to a fourteenth aspect, the one or more radar antennas and/or lasers is/are configured to emit a signal and detect a return signal; and the acquisitioning unit is configured to acquire the acquired sensor data based on the return signal.

According to a fifteenth aspect a vehicle has one or more devices according to any one of the twelfth to fourteenth aspect.

This document also describes a computer-readable storage media comprising instructions that, when executed, configure at least one processor to perform the above-summarized method and other methods set forth herein

DETAILED DESCRIPTION

Embodiments of the present disclosure will now be described in reference to the enclosed figures. In the following detailed description, numerous specific details are set forth. These specific details are only to provide a thorough understanding of the various described embodiments. Further, although the terms first, second, etc. may be used to describe various elements, these elements should not be limited by these terms. These terms are only used to distinguish one element from another.

According to the concept of the present disclosure, a unified neural network structure is proposed to process sensor-based data in BEV. It represents sensor-based data with different spatial resolutions which are processed by different branches (or also referred to as heads in terminology of deep neural networks). These branches interact with each other at intermediate stages of the deep neural network. The final detection output is the fusion of output of all branches.

Figure 1:
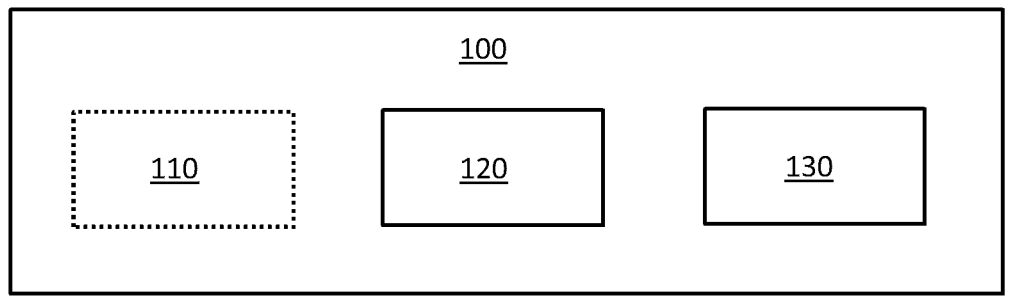
FIG. 1 shows a device according to an embodiment of the present disclosure.
Figure 2:
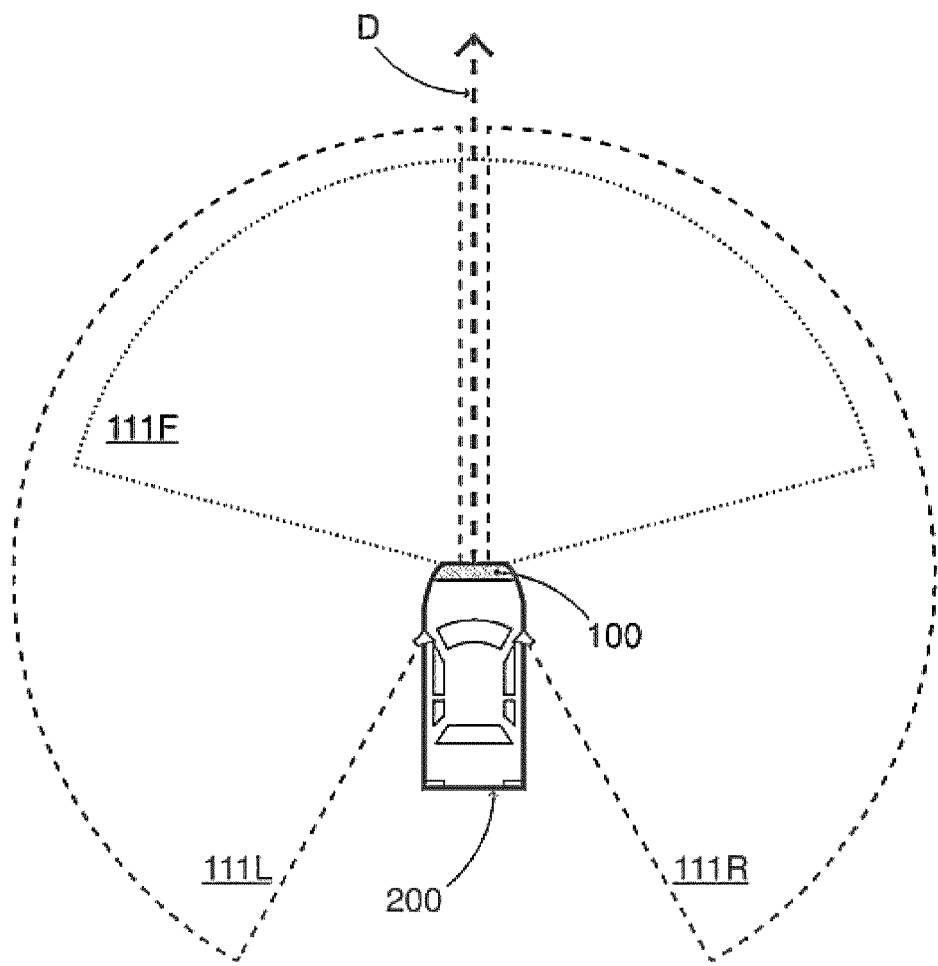
FIG. 2 shows a device according to a preferred embodiment of the present disclosure for object detection in a surrounding of a vehicle.

FIG. 1 shows a device 100 according to an embodiment of the present disclosure for object detection in a surrounding of a vehicle using a deep neural network. The device 100 may be provided to a vehicle 200 as shown in FIG. 2 and, preferably, may be mounted on the vehicle 200 facing a driving direction of the vehicle. The skilled person understands that it is not required that the device 100 faces the driving direction; the device 100 can also face to a side direction or to a rear direction. The device 100 may be a radar sensor, a radar module, part of a radar system or the like. The device 100 may also be a Light Detection and Ranging (LiDAR) type sensor, LiDAR type module or part of a LiDAR type system which uses laser pulses (in particular, infrared laser pulses) instead of radio waves.

A vehicle 200 may be any land vehicle that is moved by machine power. Such a vehicle 200 may also be tied to railroad tracks, floating, diving or airborne. The figures exemplify this vehicle 200 as a car, with which the device 100 is provided. The present disclosure is, however, not limited thereto. Hence, the device 100 may also be mounted to e.g., a lorry, a truck, a farming vehicle, a motorbike, a train, a bus, an aircraft, a drone, a boat, a ship, a robot, or the like.

The device 100 may have a plurality of detection areas, for example be orientated such that it has a forward detection area 111, a left detection area 111L and/or a right detection area 111R as shown in FIG. 2. In addition, an extension of the detection areas (such as a near field detection area, far field detection area) may differ.

As illustrated in FIG. 1, the device 100 includes an acquisitioning unit 120 and a determining unit 130, and may additionally include one or more antennas or lasers 110, but the one or more antennas or lasers may also be provided separate to the device 100.

The one or more antennas 110 may be radar antennas. Herein, the one or more antennas 110 may be configured to emit radar signals, preferably modulated radar signals, e.g., a Chirp-Signal. A signal may be acquired or detected at the one or more antennas 110 and is generally referred to as return signal below. Herein, the return signal(s) may result from a reflection of the emitted radar signal(s) on an obstacle or object (such as a pedestrian, another vehicle such as a bus or car) in the surrounding of the vehicle but may also include a noise signal resulting from noise which may be caused by other electronic devices, other sources of electromagnetic interference, thermal noise, and the like.

The one or more antennas may be provided individually or as an array of antennas, wherein at least one antenna of the one or more antennas 110 emits the radar signal(s), and at least one antenna of the one or more antennas 110 detects the return signal(s). The detected or acquired return signal(s) represents a variation of an amplitude/energy of an electromagnetic field over time.

The acquisitioning unit 120 is configured to acquire radar data regarding each of the one or more radar antennas 110, the acquired radar data include range data and range rate data. The acquisitioning unit 120 may acquire the return signal, detected at the one or more antennas, and may apply an analog-to-digital (A/D) conversion thereto. The acquisitioning unit 120 may convert a delay between emitting the radar signal(s) and detecting the return signal(s) into the range data. The delay, and thereby the range data, may be acquired by correlating the return signal(s) with the emitted radar signal(s). The acquisitioning unit 120 may compute, from a frequency shift or a phase shift of the detected return signal(s) compared to the emitted radar signal(s), a doppler shift or a range-rate shift as the range rate data. The frequency shift or the phase shift, and thereby the range rate-data, may be acquired by frequency-transforming the return signal(s) and comparing its frequency spectrum with the frequency of the emitted radar signal(s). The determination of range data and range-rate/Doppler data from the detected return signal(s) at the one or more antennas may, for example, be performed as described in U.S. Pat. No. 7,639,171 or 9,470,777 or EP 3 454 079.

Although an example of acquiring sensor-based data in the form of radar data is described above, the present disclosure is not limited in that regard, and the acquisition unit 120 may also acquire LiDAR-based sensor data.

The acquisition unit 120 may acquire the sensor-based data in a data cube indicating, for example, range and angle values in a polar coordinate system, each for a plurality of range rate (Doppler) values. In such a case, the acquisition unit 120 (or alternatively the determining unit 130 described below) may be further configured to performs a conversion of the (range, angle) data values from polar coordinates into Cartesian coordinates, i.e., a conversion of the (range, angle) data values into (X, Y) data values. Advantageously, the conversion is performed in such a way that multiple Cartesian grids with different spatial resolutions and spatial dimensions are generated, for example a near range (X, Y) grid having a spatial dimension of 80 m by 80 m and a spatial resolution of 0.5 m/bin and a far range (X, Y) grid having a spatial dimension of 160 m by 160 m and a spatial resolution of 1 m/bin. The skilled person recognizes that this is a more efficient data representation (e.g., with regard to memory requirements) as compared to generating a single (X, Y) grid having a spatial dimension of 160 m by 160 m and a spatial resolution of 0.5 m/bin.

In other words, given acquired sensor data in BEV from, for example, a LiDAR or RADAR point cloud, first the point cloud may be converted into multiple grids in a world Cartesian coordinate system centered at the vehicle or ego-vehicle (e.g., an autonomous vehicle or robot). In this process, two parameters (spatial range and resolution) may be defined. In general, longer range and higher resolution are desired to detect more targets and better describe their shapes. However, longer range and higher resolution lead to higher memory requirements, memory consumption and higher computational costs. To deal with this technical problem, the present disclosure represents sensor-based data by multiple Cartesian grids with different spatial ranges and resolutions. As such, acquired sensor data points may be converted into a short-range Cartesian grid and a far-range grid and corresponding different resolutions. Here, the short-range grid has a higher spatial resolution while the far-range grid has a lower spatial resolution. For example, if the far-range and the short-range cover 100 m and 50 m, respectively, the grid size may by 100×100 for both ranges. In this case, the spatial resolution for the far-range and the short-range are 1 m/grid (1 m/bin) and 0.5 m/grid (0.5 m/bin), respectively. In praxis, the grid (bin) size for different ranges may be different. As mentioned above, the data in the far-range is sparser than those in near-range, therefore high resolution is unnecessary.

The determining unit 130 is configured to use the set of sensor-based data, e.g., radar-based data or LiDAR-based data, in the multiple Cartesian grids with different spatial resolutions and spatial dimensions in a deep neural network to detect an object in the surrounding of the vehicle 200. This is further explained below in the context of FIG. 3 which shows a flow chart according to a computer-implemented method of an embodiment of the present disclosure.

Figure 3:
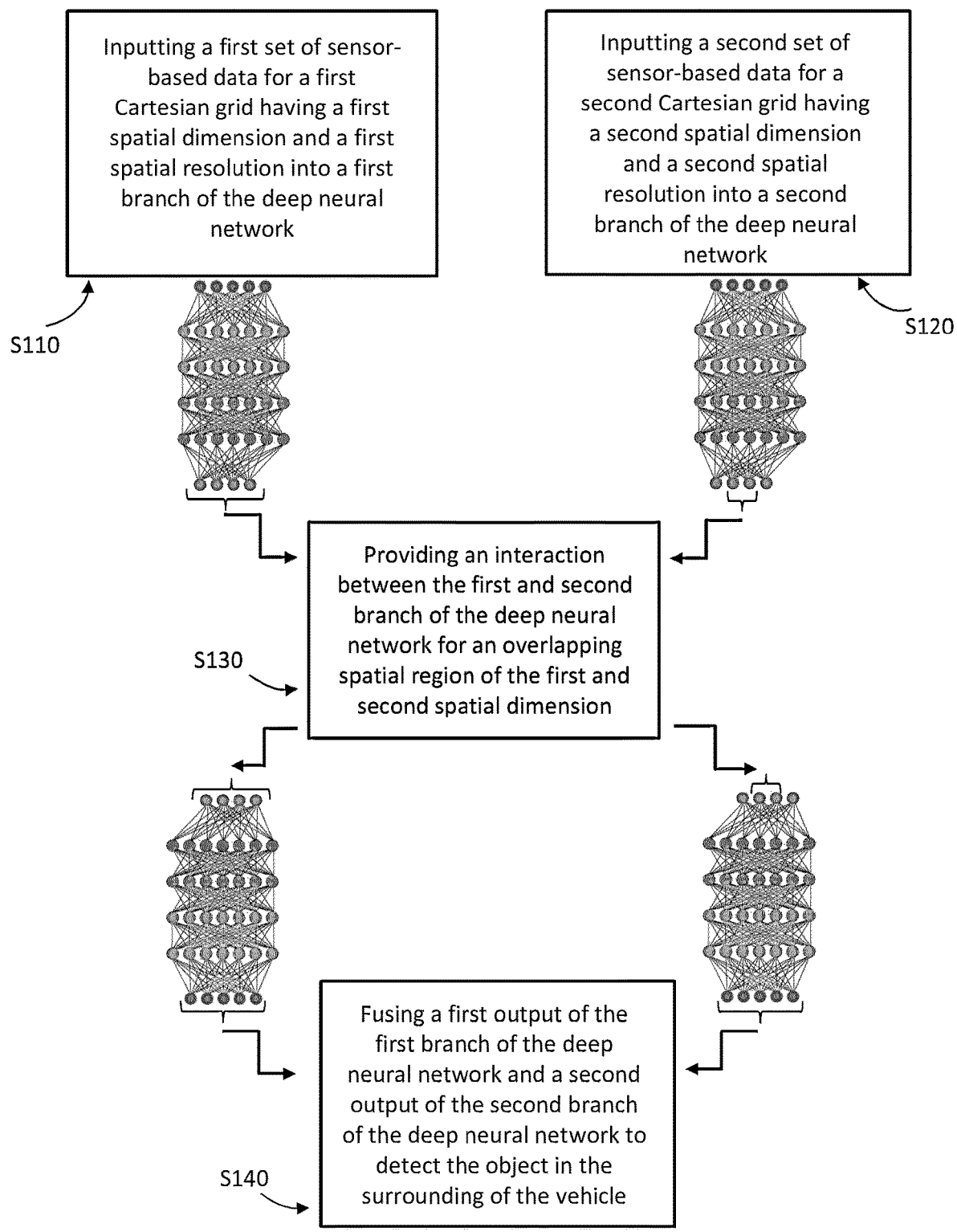
FIG. 3 shows a flow chart of a method according to an embodiment of the present disclosure.

FIG. 3 shows a flow chart of a computer-implemented method according to an embodiment of the present disclosure. According to step S110 in FIG. 3, a first set of sensor-based data, e.g., radar-based data or LiDAR-based data, for a first Cartesian grid having a first spatial dimension and a first spatial resolution is input into a first branch (also referred to as head) of the deep neural network. In addition, according to step S120 in FIG. 3, a second set of sensor-based data for a second Cartesian grid having a second spatial dimension and a second spatial resolution is input into a second branch of the deep neural network. Here, the first set of sensor-based data and the second set of sensor-based data are sensor-based data of the surrounding of the vehicle.

As explained above, the first spatial dimension is different from the second spatial dimension and the first spatial resolution is different from the second spatial resolution, and the first set of sensor-based data and the second set of sensor-based data are generated from a set of acquired sensor data regarding the surrounding of the vehicle for different spatial resolutions and dimensions. Further, as the first set of sensor-based data and the second set of sensor-based data are generated from the same acquired sensor data, the first set of sensor-based data and the second set of sensor-based data include an overlapping region in Cartesian space. In the above example of a near range (X, Y) Cartesian grid having a spatial dimension of 80 m by 80 m and a spatial resolution of 0.5 m/bin and a far range Cartesian (X, Y) grid having a spatial dimension of 160 m by 160 m and a spatial resolution of 1 m/bin, the overlapping region may be a [−40 m, 40 m] range by [−40 m, 40 m] range spatial region around a vehicle (placed at position (X,Y)=(0, 0) in the BEV.

Here, the deep neural network employs an artificial neural network architecture having multiple layers of respective network nodes to progressively extract higher-level features from the inputted sensor-base data. The deep neural network may be a convolutional neural network using convolution operations rather than general matrix multiplication in one or more layers and may be provided with self-determined (self-learned) kernel functions or filter functions. The deep neural network may be trained on the basis of publicly available datasets such as the Waymo dataset (https://waymo.com/open/data/), the KITTI dataset (http://www.cvlibs.net/datasets/kitti/), the NuScenes dataset (https://www.nuscenes.org/), the PeRL dataset (http://robots.engin.umich.edu/SoftwareData/Ford), the Oxford RobotCar dataset (https://robotcar-dataset.robots.ox.ac.uk/datasets/) and the like, see also https://www.ingedata.net/blog/lidar-datasets which are available for both LiDAR-based data sets as well as radar-based data sets. In the case in which publicly available datasets in the form of point clouds are used, the point clouds are converted into Cartesian grids with different spatial ranges and resolutions.

Alternatively, the training data may be multiple sequences of data cubes recorded from road scenarios, as well as the manually labeled targets (also known as ground truth). The sequences may be cut into small chunks with a fixed length. As such, the training data may be formatted as a tensor of size N×T×S×R×A×D, where N is the number of training samples (e.g. 50 k) in which each training sample may include a set of bounding boxes, T is the length of chunk (e.g. 12 time stamps), S is the number of sensors (e.g. 4), R is number of range bins (e.g. 108), A is number of angle bins (e.g. 150), D is number of Doppler bins (e.g. 20). The neural network may take a certain number of training samples (also referred to as batch size, e.g., 1 or 4 or 16, dependent graphical processing unit (GPU) memory availability of the like), calculate the outputs and the loss with respect to ground truth labels (i.e. a difference between the ground truth and the detection result), update network parameters by backpropagation of the loss, and iterate this process until all the N samples are used. This process is called an epoch (i.e., one cycle through the full training dataset). The neural network may be trained with multiple epochs, e.g., 10, to get a result that minimizes errors and maximizes accuracy. The above specific numerical values are examples for performing a training process of the neural network.

According to step S130 in FIG. 3 an interaction is provided between the first branch of the deep neural network and the second branch of the deep neural network at an intermediate stage of the deep neural network. Here, the intermediate stage may be provided after a predetermined number of layers in the deep neural network. In particular, the intermediate stage may be provided after a predetermined number of layers in the deep neural network have independently or separately processed the first set of sensor-based data and the second set of sensor-based data in the first branch and the second branch, respectively. The interaction at the intermediate stage of the deep neural network is provided to take into account, in further processing of subsequently layers of the deep neural network (i.e., processing of the deep neural network after the intermediate stage), respectively identified features up until the intermediate stage for an overlapping spatial region of the first and second spatial dimension. The overlapping region is a common spatial region of the first Cartesian grid and the second Cartesian grid and may be a central spatial region around a vehicle, e.g., a [−40 m, 40 m] range by [−40 m, 40 m] range spatial region around a vehicle, as explained above.

That is, first features which have been identified by the first branch of the deep neural network at the level of the intermediate stage with regard to the first set of sensor-based data are taken into account in the further processing in the second branch of the deep neural network, and simultaneously second features which have been identified by the second branch of the deep neural network at the level of the intermediate stage with regard to the second set of sensor-based data are taken into account in the further processing in the first branch of the deep neural network. The respective branches of the deep neural network therefore interact to incorporate features identified for different spatial dimension and resolution in the further processing of the deep neural network.

According to step S140 in FIG. 3 a first output of the first branch of the deep neural network and a second output of the second branch of the deep neural network is then fused (output fusion) to detect an object in the surrounding of the vehicle, in particular also a property of the object in the surrounding of the vehicle. That is, while the respective first and second branches of the deep neural network, which may be independently trained on the basis of the publicly available training data, generate independent outputs including identified features of objects in the surrounding of the vehicle, the fusion of the identified features of the first and second outputs gathers identified feature information of an object from multiple spatial scales or resolutions to improve the accuracy of the final object detection.

In the above embodiment, two sets of sensor-based data for Cartesian grids of different spatial resolution and different spatial dimension are used. The present disclosure is, however, not limited in that regard. In particular, three or more sets of sensor-based data for Cartesian grids of different spatial resolution and different spatial dimension may be generated from the same acquired sensor data and may thus be input into three or more independent branches of the deep neural network. Subsequently, the above described interaction may be performed between each two of the three (i.e., between branch 1 and branch 2, between branch 1 and branch 3, and between branch 2 and branch 3) or more branches at one or more intermediate stages. The skilled person understands that such an embodiment involves more than one spatial overlapping region. After further processing in the three or more independent branches of the deep neural network, the output of the respective branches is fused to detect an object or a plurality of objects in the surrounding of the vehicle.

Figure 4:
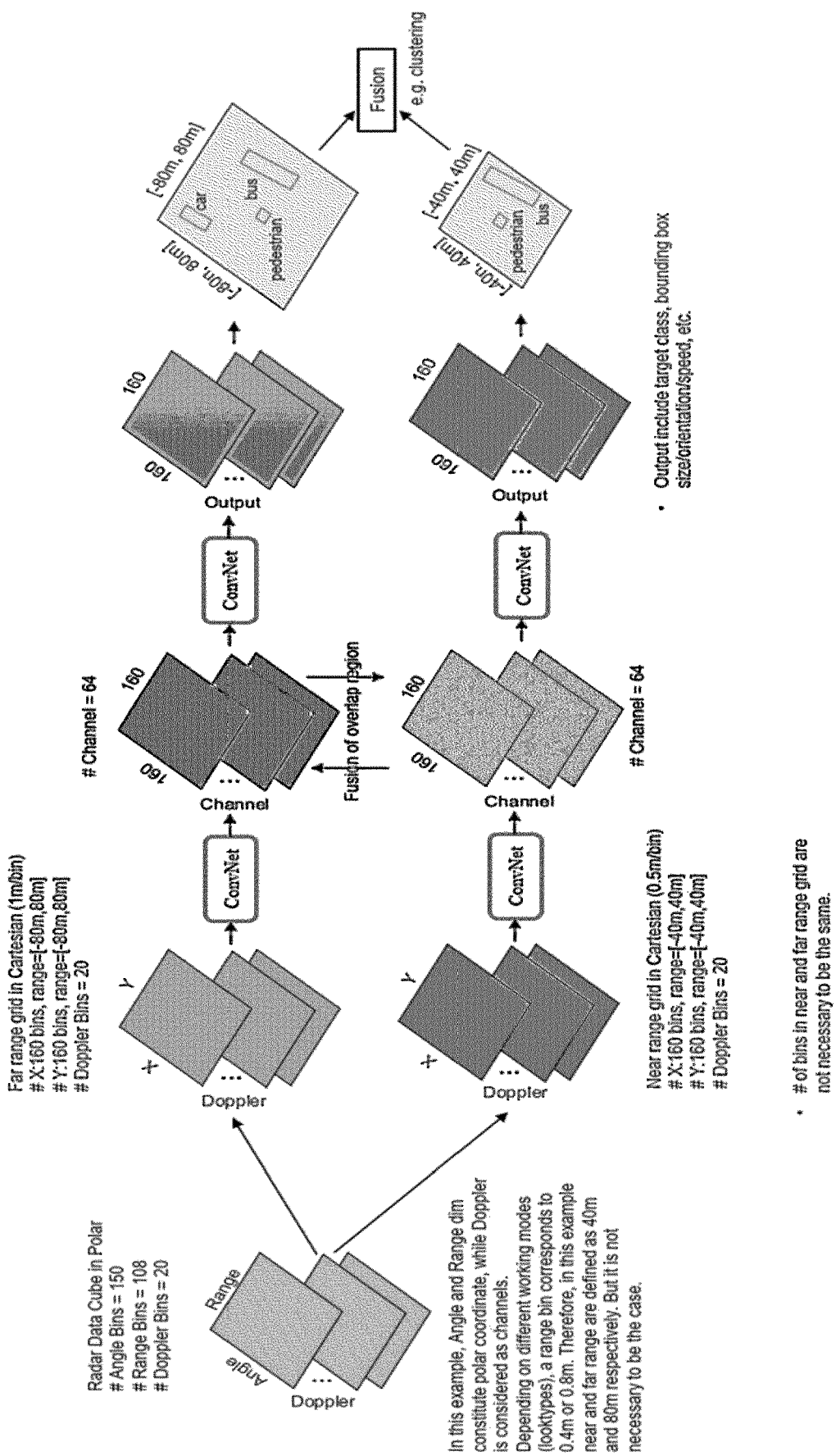
FIG. 4 shows a flow chart of a method according to a further embodiment of the present disclosure.

A preferred embodiment of the present disclosure is shown in FIG. 4. Here, the sensor-based data are radar data which may be acquired in a data cube representing angle and range data in polar coordinates as well as Doppler (range rate) data. For example, the data cube may have 150 angle values (bins) and 108 range values (bins) in polar coordinates for each of 20 Doppler (range rate) values (bins).

According to this preferred embodiment, the acquisition unit 120 (or alternatively the determining unit 130 described below) may be further configured to perform a conversion of the (range, angle) data values from polar coordinates into Cartesian coordinates, i.e. a conversion of the (range, angle) data values into Cartesian (X, Y) data values (bins), in particular so that a near range Cartesian (X, Y) grid having a spatial dimension of 80 m by 80 m and a spatial resolution of 0.5 m/bin and a far range Cartesian (X, Y) grid having a spatial dimension of 160 m by 160 m and a spatial resolution of 1 m/bin is generated, each for a plurality Doppler (range rate) values (bins). Although the number of values (bins) in the near field and far field Cartesian grids is the same in this embodiment, this is not a restriction, and the number can also be different.

According to this preferred embodiment, as shown in FIG. 4, the far range radar-based data values and the near range radar-based data values are input into respective independent branches of a convolutional neural network having a plurality of layers. Then, at an intermediate stage of the convolutional neural network, an interaction is provided between the first branch and the second branch of the convolutional neural network to provide, for the overlapping region of the near and far range grid, a fusion or combination of features identified by the respective branches of the convolutional neural network on the different spatial dimensions and resolutions.

For example, a feature may be considered as a feature value at every grid cell output at the intermediate stage. That is, each output of the convolutional neural network may be considered as a 2D feature map, here for each of the near range and the far range, and for each of a plurality of channels (for example, 64 channels in FIG. 4). As such feature maps refer to multiple 2-D grids, every grid encoding an aspect of data. For example, a color image with red-green-blue (RGB) channels can be considered as feature maps with 3 channels. In this embodiment, the fusion of features means a concatenation of feature maps from different branches and a reduction of number of channels, so that the identified features of the first branch (with regard to the far range grid) are subsequently taken into account in the second branch (with regard to the near range grid) of the convolutional network and vice versa.

As further shown in FIG. 4, the first and second output of the convolutional neural network and may include detected object properties such as a target class, a bounding box, a size of an object, a position of the object, an orientation of an object, and/or a speed of an object (based on the Doppler data). It is noted that the position and the size of the object may be derived from the bounding box. As shown in FIG. 4, the first output of the convolutional neural network may identify a bounding box for a car, a pedestrian, and a bus, while the second output of the convolutional neural network may identify the pedestrian and the bus (but not the car since the car is not located in the near range grid). A subsequent fusion of the first and second output of the convolutional neural network may be done, for example based on clustering bounding boxes, to verify whether the object(s) (such as the bus) is detected in both outputs and/or to use a statistical analysis for both the first and second output to provide a final output with regard to the detected object(s) while a statistical measure with regard to the differences of the first and second output may be optimized to improve the accuracy of object detection.

According to a further embodiment, the interaction S130 may be further provided by re-sampling a first intermediate output (e.g., a first feature map) of the first branch at the intermediate stage and by re-sampling a second intermediate output (e.g., a second feature map) of the second branch at the intermediate stage. Here, the respective intermediate outputs are outputs after the predetermined number of layers in the deep or convolutional neural network. Re-sampling may be performed by matching the spatial resolution of the first intermediate output to the second intermediate output. This re-sampling improved the interaction, as a more efficient and simple fusion of respective outputs is achieved.

Figure 5:
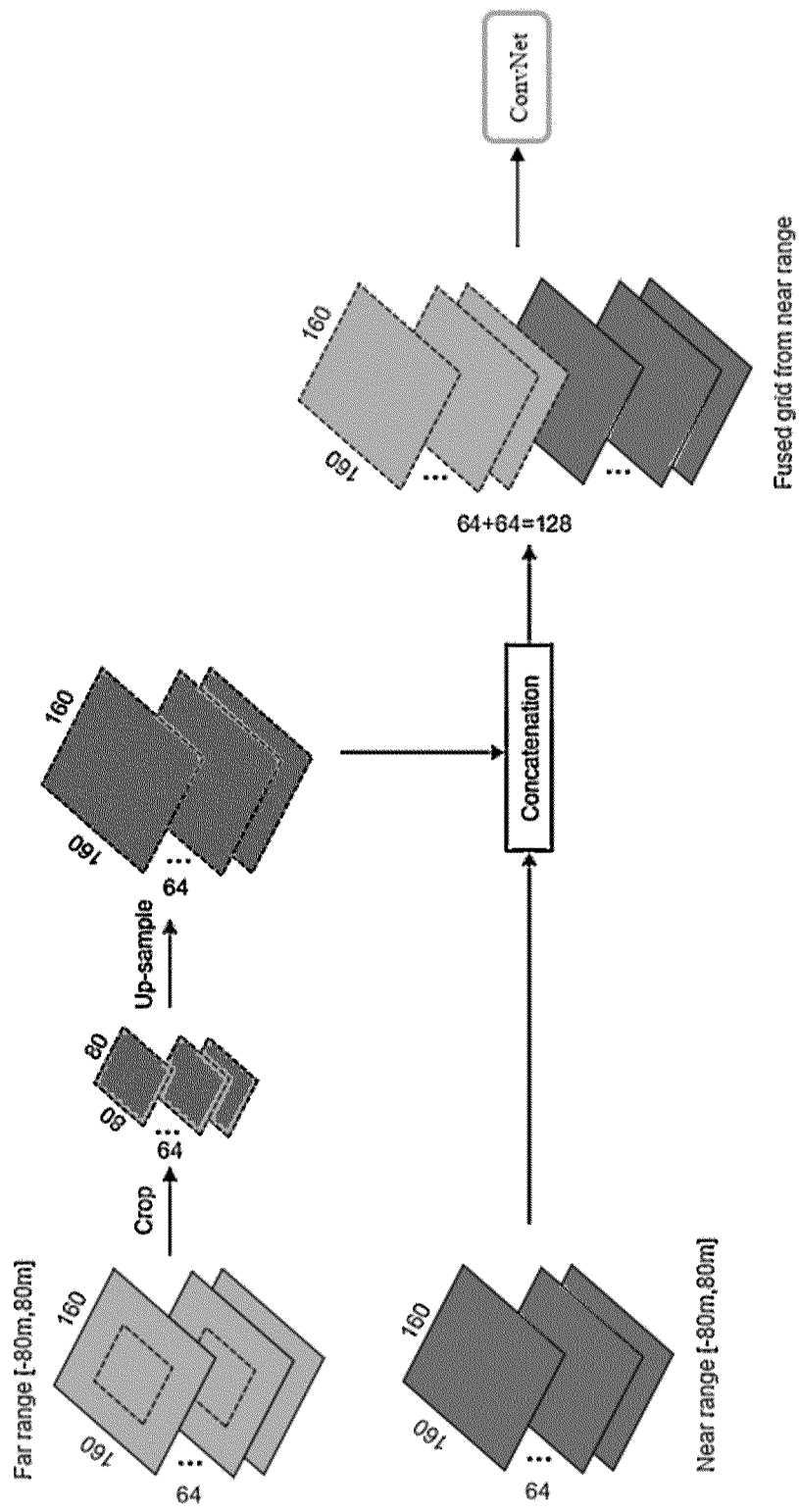
FIG. 5 shows a flow chart of a method according to a further embodiment of the present disclosure.

An embodiment of the re-sampling of the first intermediate output is shown in FIG. 5. Here, with regard to the intermediate output of the first branch with regard to the far range grid, having 160 by 160 feature values in a spatial range of [−160 m, 160 m], for example, the overlapping spatial region of [−80 m, 80 m] may be cropped to 80 by 80 feature values in the overlapping spatial region and subsequently up-sampled to 160 by 160 feature values for the overlapping region. This up-sampled first intermediate output may be easily merged or fused (by concatenation and/or reduction, as will be explained below) with the second intermediate output of the second branch.

Figure 6:
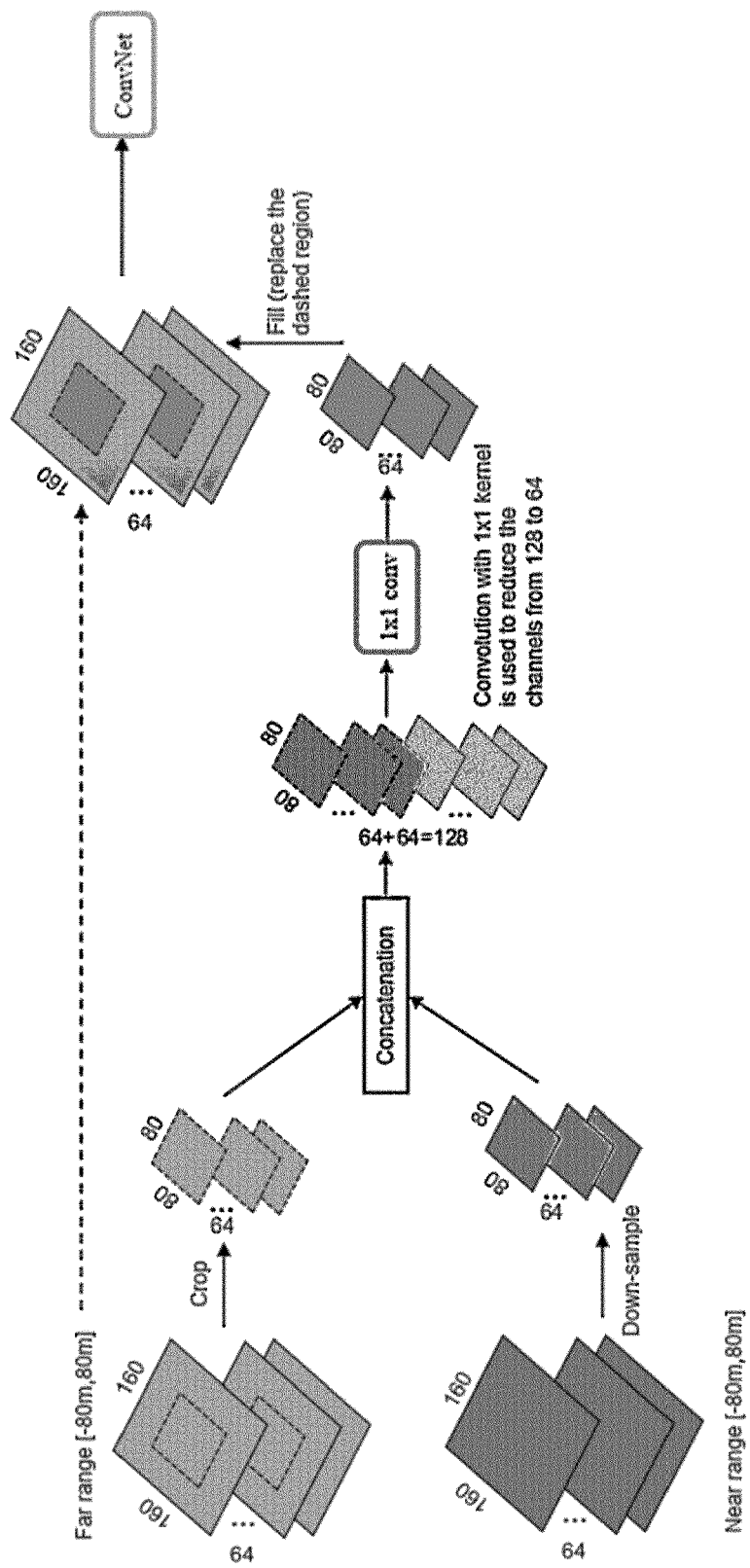
FIG. 6 shows a flow chart of a method according to a further embodiment of the present disclosure.

An embodiment of the re-sampling of the second intermediate output is shown in FIG. 6. This shows that the intermediate output of the second branch with regard to the near range grid, having 160 by 160 feature values in a spatial range of [−80 m,80 m], is down-sampled to 80 by 80 feature values having a spatial resolution that matches the spatial resolution of the first intermediate output. Here, the down-sampled second intermediate output may be easily merged or fused (by concatenation and/or reduction, as will be explained below) with the first intermediate output of the first branch, in particular the cropped intermediate output of the first branch corresponding to the overlapping region.

As such, as shown in both FIGS. 5 and 6, the interaction at the intermediate stage of the neural network further can be performed by merging the first intermediate output with the re-sampled second intermediate output and by merging the second intermediate output with the re-sampled first intermediate output. Here, the merging may generate a first concatenation of the first intermediate output with the re-sampled second intermediate output and generate a second concatenation of the second intermediate output with the re-sampled first intermediate output.

Here, in the embodiments of FIGS. 5 and 6, the concatenations may combine the respective channels of the first intermediate output (e.g. 64 channels) with the re-sampled second intermediate output (e.g. 64 channels) to arrive at a combined grid (e.g. 64+64=128 channels) and the second intermediate output (e.g. 64 channels) with the re-sampled first intermediate output (e.g. 64 channels) to arrive at a combined grid (e.g. 64+64=128 channels), thus combining all channels at the concatenations.

The merging may further include a reduction of the first concatenation to generate a first reduced output (as further illustrated for example in FIG. 6) and a reduction of the second concatenation to generate a second reduced output, wherein the first reduced output and the second reduced output is used in the processing of the subsequent layers of the deep neural network. For example, the reduction may employ a kernel (e.g., a 1×1 kernel) to reduce the channels to the number of channels as output at the intermediate stage. In FIG. 6, a 1×1 kernel of the convolutional neural network is used to reduce the number of channels back from 128 to 64.

The first reduced output or the second reduced output may then be used to replace a corresponding part of the first intermediate output or the second intermediate output. The skilled person recognizes that the corresponding part preferably refers to the overlapping region. In FIG. 6, for example, the overlapping region in the first intermediate output (with regard to the far range Cartesian grid) is replaced by the reduced output of the interaction with regard to the near range Cartesian grid.

The interaction at the intermediate stage thus introduces features independently recognized by the first and second branches of the neural network into the corresponding other branch of the neural network, providing the capability to take into account feature detection at different spatial resolution in all subsequent layers of the neural network in both the first and second branch. In that sense, while the first and second branch also perform independent data processing after the intermediate stage to generate independent outputs, there is a mixing of feature detection for different spatial dimensions and resolutions ate the intermediate stage of the neural network. This not only provides a more efficient data representation (as explained above) but also an improved accuracy of object detection.

This may also be referred to as feature fusion. That is, as multiple grids of different spatial dimension and resolution are processed separately by a convolutional or deep neural network, this produces some intermediate feature maps at the intermediate stage. Without loss of generality, the feature maps have the same spatial resolution as the input grids. As in FIGS. 5 and 6, the feature maps from different ranges have an overlapping region which may be the center region. In this overlapping region, multiple feature maps are available which may therefore be fused. For example, the center part of the far-range feature map may be up-sampled and merged with the short-range feature map. At the same time, the short-range feature map may be down-sampled to merge with the center part of the far-range feature map. The merge operation can be implemented by a concatenation and reduction which are common in deep neural networks.

Referring back to FIG. 3, after further independent processing of each branch of the neural network after the intermediate stage, each grid generates a set of final outputs, e.g., bounding box and class label of targets, segmentation mask of a scene and the like.

They need to get fused to get a final output. Here, the fusing S140 of the first output (final output) of the first branch of the deep neural network and the second output (final output) of the second branch of the deep neural network may further include a filtering out of overlapping one or more bounding boxes. For a bounding box output, a traditional non-maximum suppression (NMS) may be used to filter out overlapping ones. Advantageously, this avoids providing a fuzzy object detection in which the same object (e.g., a bus or the like) is identified by a plurality of overlapping bounding boxes.

Further, the fusing S140 of the first output (final output) of the first branch of the deep neural network and the second output (final output) of the second branch of the deep neural network may also further include a prioritizing of information from the first output or the second output by using range information. For example, small objects such as pedestrians are detected more accurately from the short-range, therefore a higher confidence may be associated to a pedestrian bounding box. For a segmentation output, segmentation masks may be resampled into the same resolution and may then be added. Similarly, range prior can be used to perform a weighted sum. That is, as more confidence may be associated to obstacles or other objects (and corresponding bounding boxes) in the near range Cartesian grid, the corresponding information in the final output of the neural network may be more precise. Accordingly, a statistical analysis may provide more statistical weight to the output information of the near range Cartesian grid as compared to the output information of the far range Cartesian grid.

Figure 7:
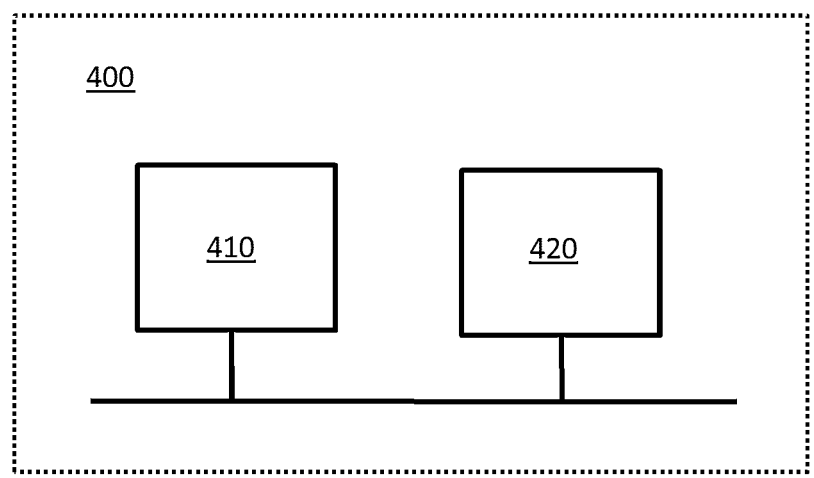
FIG. 7 shows a computer according to a preferred embodiment.

The computer-implemented method described above may be stored as a computer program in the memory 410 of a computer 400, which may be a board computer of the vehicle, a computer of a device, radar sensor, radar system, LiDAR sensor, LiDAR system or the like and may be executed by a processor 420 of the computer 400 as shown in FIG. 7.

It will be apparent to those skilled in the art that various modifications and variations can be made in the entities and methods of this disclosure as well as in the construction of this disclosure without departing from the scope or spirit of the disclosure.

The disclosure has been described in relation to particular embodiments which are intended in all aspects to be illustrative rather than restrictive. Those skilled in the art will appreciate that many different combinations of hardware, software and/or firmware will be suitable for practicing the present disclosure.

Moreover, other implementations of the disclosure will be apparent to those skilled in the art from consideration of the specification and practice of the disclosure disclosed herein. It is intended that the specification and the examples be considered as exemplary only. To this end, it is to be understood that inventive aspects lie in less than all features of a single foregoing disclosed implementation or configuration. Thus, the true scope and spirit of the disclosure is indicated by the following claims.

What is claimed is:

1. A method comprising:
    inputting a first set of sensor-based data for a first Cartesian grid having a first spatial dimension and a first spatial resolution into a first branch of a deep neural network;
    inputting a second set of sensor-based data for a second Cartesian grid having a second spatial dimension and a second spatial resolution into a second branch of the deep neural network;
    combining, at an intermediate state of the deep neural network and to be used in subsequent layers of the respective first and second branch of the deep neural network, first intermediate output of the first branch to the second branch of the deep neural network and a second intermediate output of the second branch to the first branch of the deep neural network, wherein the first and second intermediate outputs represent features identified at the intermediate stage of the deep neural network in an overlapping spatial region of the first and second spatial dimension; and
    fusing a first output of the first branch of the deep neural network and a second output of the second branch of the deep neural network to detect an object in a surrounding of a vehicle.

2. The method of claim 1, wherein the first spatial dimension is different from the second spatial dimension and the first spatial resolution is different from the second spatial resolution.

3. The method of claim 1, wherein the step of combining comprises re-sampling the spatial resolution of the first intermediate output of the first branch at the intermediate stage and re-sampling the spatial resolution of the second intermediate output of the second branch at the intermediate stage.

4. The method of claim 3, the step of combining comprises merging the first intermediate output with the re-sampled second intermediate output and merging the second intermediate output with the re-sampled first intermediate output.

5. The method of claim 4, wherein the merging includes generating a first concatenation of the first intermediate output with the re-sampled second intermediate output and generating a second concatenation of the second intermediate output with the re-sampled first intermediate output.

6. The method of claim 5, wherein the merging further includes a reduction of the first concatenation to generate a first reduced output and a reduction of the second concatenation to generate a second reduced output, wherein the first reduced output and the second reduced output is used in the processing of the subsequent layers of the deep neural network.

7. The method of claim 6, wherein the first reduced output or the second reduced output is used to replace a corresponding part of the first intermediate output or the second intermediate output.

8. The method of claim 1, wherein the fusing includes a filtering out of overlapping one or more bounding boxes.

9. The method of claim 1, wherein the fusing includes a prioritizing of information from the first output or the second output by using range information.

10. The method of claim 1, wherein the first output and the second output include information related to one or more of a target class, a bounding box, a size of the object, a position of the object, an orientation of the object and a speed of the object.

11. A computer-readable storage media comprising instructions that, when executed, configure at least one processor to:
input a first set of sensor-based data for a first Cartesian grid having a first spatial dimension and a first spatial resolution into a first branch of a deep neural network;
input a second set of sensor-based data for a second Cartesian grid having a second spatial dimension and a second spatial resolution into a second branch of the deep neural network;
combine, at an intermediate stage of the deep neural network and to be used in subsequent layers of the respective first and second branch of the deep neural network, first intermediate output of the first branch to the second branch of the deep neural network and a second intermediate output of the second branch to the first branch of the deep neural network, wherein the first and second intermediate outputs represent features identified at the intermediate stage of the deep neural network in an overlapping spatial region of the first and second spatial dimension; and
fuse a first output of the first branch of the deep neural network and a second output of the second branch of the deep neural network to detect an object in a surrounding of a vehicle.

12. The computer-readable storage media of claim 11, wherein the first spatial dimension is different from the second spatial dimension and the first spatial resolution is different from the second spatial resolution.

13. The computer-readable storage media of claim 11, wherein the instructions are further configured to provide the step of combining by:
re-sampling the spatial resolution of the first intermediate output of the first branch at the intermediate stage and by re-sampling the spatial resolution of the second intermediate output of the second branch at the intermediate stage.

14. The computer-readable storage media of claim 13, wherein the instructions are further configured to provide the combining by:
merging the first intermediate output with the re-sampled second intermediate output and merging the second intermediate output with the re-sampled first intermediate output.

15. The computer-readable storage media of claim 14, wherein the instructions are further configured to merge the first intermediate output with the re-sampled second intermediate output and merge the second intermediate output with the re-sampled first intermediate output by at least:
generating a first concatenation of the first intermediate output with the re-sampled second intermediate output and generating a second concatenation of the second intermediate output with the re-sampled first intermediate output.

16. The computer-readable storage media of claim 15, wherein the instructions are further configured to merge the first intermediate output with the re-sampled second intermediate output and merge the second intermediate output with the re-sampled first intermediate output by at least:
reducing the first concatenation to generate a first reduced output and reducing the second concatenation to generate a second reduced output, wherein the first reduced output and the second reduced output is used in the processing of the subsequent layers of the deep neural network.

17. The computer-readable storage media of claim 16, wherein the first reduced output or the second reduced output is used to replace a corresponding part of the first intermediate output or the second intermediate output.

18. A device comprising:
an acquisitioning unit configured to acquire sensor-based data regarding each of one or more radar antennas or lasers;
a determining unit configured to:
input a first set of sensor-based data for a first Cartesian grid having a first spatial dimension and a first spatial resolution into a first branch of a deep neural network;
input a second set of sensor-based data for a second Cartesian grid having a second spatial dimension and a second spatial resolution into a second branch of the deep neural network;
combine, at an intermediate stage of the deep neural network and to be used in subsequent layers of the respective first and second branch of the deep neural network, a first intermediate output of the first branch to the second branch of the deep neural network and a second intermediate output of the second branch to the first branch of the deep neural network wherein the first and second intermediate outputs represent features identified at the intermediate stage of the deep neural network in an overlapping spatial region of the first and second spatial dimension; and
fuse a first output of the first branch of the deep neural network and a second output of the second branch of the deep neural network to detect an object in a surrounding of a vehicle.

19. The device of claim 18, further comprising one or more radar antennas or lasers.

20. The device of claim 19, wherein
the one or more radar antennas or lasers are configured to emit a signal and detect a return signal; and
the acquisitioning unit is configured to acquire the acquired sensor-based data based on the return signal.

* * * * *